May 25, 1948. P. D. ROSS 2,442,213
DYNAMOELECTRIC MACHINE
Filed Dec. 29, 1944
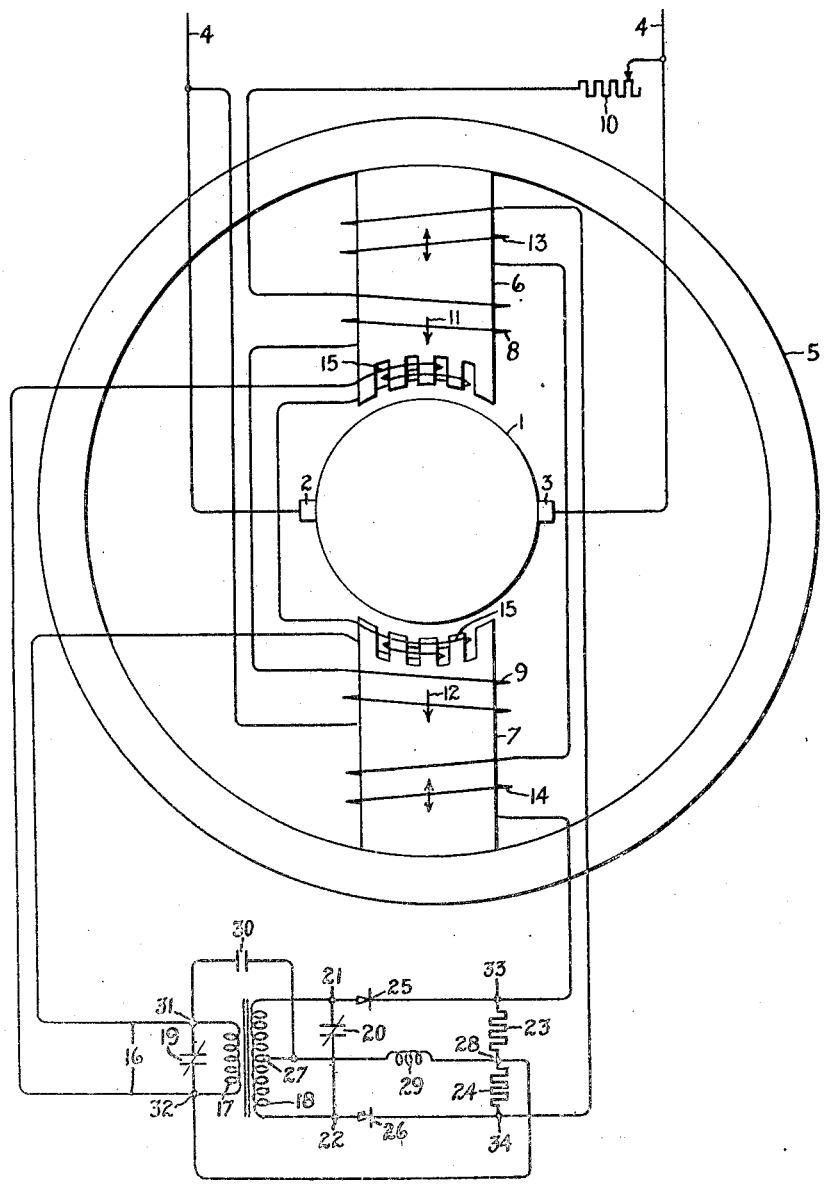
Inventor:
Paul D. Ross,
by *Harry E. Dunham*
His Attorney.

Patented May 25, 1948

2,442,213

UNITED STATES PATENT OFFICE 2,442,213

DYNAMOELECTRIC MACHINE

Paul D. Ross, Schenectady, N. Y., assignor to General Electric Company, a corporation of New York Application December 29, 1944, Serial No. 570,441

3 Claims. (Cl. 318—309)

1

My invention relates to dynamoelectric machines and particularly to such machines as are adapted to be used as constant speed motors.

An object of my invention is to provide an improved dynamoelectric machine.

Another object of my invention is to provide an improved dynamoelectric machine having a field exciting winding excitation adapted to control the excitation of the machine for maintaining substantially constant speed of operation.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing is a schematic illustration of a dynamoelectric machine embodying my invention.

Referring to the drawing, I have shown a dynamoelectric machine of the direct current type provided with a rotatable member or armature 1 having a winding arranged in winding slots of the conventional type in a core of magnetic material and connected to a commutator to which power is supplied by a pair of brushes 2 and 3 connected across a source of electric power supply 4. Magnetic excitation is provided to the armature 1 by a field structure arranged as the stationary member of the machine and provided with a magnet frame 5 and salient pole pieces 6 and 7 adapted to be magnetically excited by a main control field exciting winding having coils 8 and 9 arranged on the pole pieces 6 and 7 and connected across the source of electrical power supply 4 through a variable resistor or rheostat 10 for controlling the energization of this winding. The magnetic excitation provided by this winding is indicated by the arrows 11 and 12 on the pole pieces 6 and 7.

This machine is adapted to be operated as a substantially constant speed motor at a predetermined desired operating speed which can be varied by changing the energization of the main control field exciting winding by changing the position of the rheostat 10, such that a higher speed can be obtained by weakening the field excitation or a lower speed of the motor can be obtained by increasing the excitation provided by the main control field exciting winding to provide the desired result by this conventional type of control. If, however, the motor speed varies from the predetermined desired value

2 without change in the control rheostat 10, the speed of the motor can be adjusted by changing the field excitation to a larger or smaller value in order to decrease or increase the speed respectively by some other source of excitation, and if this is done inherently, the machine will tend to maintain a substantially constant speed for any given setting of the control rheostat 10.

In order to provide this desirable inherent speed control characteristic, I provide a second field exciting winding including coils 13 and 14 on the pole pieces 6 and 7 and energize this field exciting winding to produce the desired bucking and boosting component of excitation for maintaining the speed of the machine substantially constant. This second field exciting winding is energized by a voltage which is responsive to the change in speed of the rotatable member 1 of the machine above and below the predetermined desired value. This voltage is obtained by arranging a pole face winding 15 in slots in the faces of the pole pieces 6 and 7, such that a relatively high frequency alternating current is generated in the coil sides of the winding 15 by the flux variation resulting from the passage of the teeth of the rotatable member 1 which form the sides of the winding slots for this member across the pole faces. This pole face winding 15, therefore, functions as an inductor alternator armature winding and is connected across the input circuit 16 of a balanced frequency discriminator. The discriminator circuit is of a well known type and comprises a transformer having a primary winding 17 and having a secondary winding 18 which are both tunable to resonance at the desired fixed frequency, corresponding to the desired speed of the rotatable member 1, by capacitors 19 and 20, respectively. The opposite terminals 21 and 22 of the secondary winding 18 are connected across resistances 23 and 24 through one-way rectifiers 25 and 26 of any suitable type, such as copper oxide or selenium cell rectifiers, and the midpoint 27 of the secondary winding 18 is connected to the midpoint 28 of the resistors 23 and 24 through a suitable choke coil 29 and through a capacitor 30 to one of the terminals 31 of the primary winding 17. The other terminal 32 of the primary winding 17 is connected directly to the midpoint 28 between the resistors 23 and 24. This type frequency discriminator operates in a manner such that at resonance at the desired frequency, the voltage across the transformer primary winding 17 and that across the transformer secondary winding 18 are substantially 90 degrees out of phase, and the voltage of the primary is connected in series with one half of the secondary across the rectifier 25 through the capacitor 30 and the choke coil 29, and is connected in series with the other half of the secondary through the capacitor 30, the rectifier 26, and the choke coil 29. With such an arrangement, the voltage on one half of the secondary winding 18 leads the primary voltage by 90 degrees, and the voltage across the other half of the secondary winding lags the primary winding voltage by 90 degrees, such that the voltage across the terminals 33 and 34 of the resistors 23 and 24 at the desired resonant frequency is 180 degrees out of phase, thereby producing a condition where these voltages are exactly equal and opposite, resulting in no D.-C. voltage across these resistors. The terminals 33 and 34 form the terminals of an output circuit of the frequency discriminator and are connected across the field exciting winding coils 13 and 14, such that under normal operation when the rotatable member 1 operates at the desired speed, this field exciting winding is not energized and does not affect the resultant excitation of the machine.

If the frequency impressed across the input circuit 16 of the frequency discriminator varies from the desired frequency corresponding to the desired speed of operation of the rotatable member 1 of the machine, the resonant condition of the discriminator circuit no longer exists, and the voltages impressed across the terminals 33 and 34 of the resistors 23 and 24 are no longer exactly equal. This result is obtained because the reactance of the discriminator circuit comprises the inductive reactance of the circuit and the capacitive reactance of the circuit which affect the phase relationship of the alternating current voltage component of the transformer secondary winding which is added to the component of voltage of the primary winding 17 of the transformer. The inductive reactance of a circuit varies directly with the frequency while the capacitive reactance of a circuit varies inversely with the frequency of the alternating current in the circuit, and at resonance the inductive reactance and capacitive reactance are substantially equal and opposite in the circuit and cancel each other's effect thereon. However, if the speed of the machine exceeds the predetermined desired value, the inductive reactance becomes greater than the capacitive reactance of the circuit, and a lagging voltage is added to the voltage of the transformer primary winding 17 for one half the transformer secondary winding and subtracted therefrom for the other half of the transformer secondary winding, which results in a higher voltage across one of the rectifiers 25 or 26 and the resistors 23 or 24 and a lower voltage across the other resistor 23 or 24. Since only direct current can flow through the resistors because of the rectifiers 25 and 26, this produces an unbalance in the voltage at the terminals 33 and 34 of the output circuit of the discriminator, and an energizing current will, therefore, flow through the coils 13 and 14 of the speed regulating field exciting winding of the machine. This field exciting winding is arranged on the pole pieces 6 and 7 to provide a component of excitation thereto which is cumulative to the component of excitation provided by the field exciting winding coils 8 and 9 under this condition, and will, therefore, tend to decrease the speed of the rotatable member 1 to the predetermined desired value. If the speed of the rotatable member 1 of the machine falls below the predetermined desired value, the capacitive reactance of the discriminator circuit increases and a leading component of voltage is added to the voltage of the primary winding 17 for one half the transformer secondary and subtracted therefrom for the other half of the transformer secondary, such that the voltage across one of the terminals 33 or 34 is higher than the voltage across the other terminal of the resistors 23 and 24. This increase in voltage across the output circuit terminals of the discriminator is in the opposite direction from the increase in voltage across these terminals when the inductive reactance of the circuit predominates and will energize the coils 13 and 14 of the speed regulating field exciting winding so as to provide a differential component of excitation to the machine relative to the component of excitation provided by the control field exciting winding, thereby decreasing the resultant excitation of the machine and producing an increase in the speed of the rotatable member 1 until the predetermined desired speed thereof is restored. Any other suitable frequency discriminator can be used, and if desired, an amplifier can also be added to the circuit to increase the energization supplied to the speed regulating field exciting winding. The discriminator circuit and its operation does not form a part of my invention and is fully described in Patents 2,341,936 and 2,341,937, J. E. Maynard, February 15, 1944, assigned to the assignee of this application. Furthermore, the discriminator output circuit can be connected directly to buck or boost the energization of the main control field exciting winding without the use of the second field exciting winding. Thus, it is seen that I have provided a dynamoelectric machine having a substantially constant speed characteristic which is provided by an inherent regulation of the excitation of the machine together with a suitable discriminator circuit which does not employ any electronic devices, but provides only relatively rugged and simple equipment which is particularly desirable in certain locations and for certain types of work.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having a stationary member and a rotatable member with a winding in slots, said stationary member having means including a main control field exciting winding for providing excitation to said machine, means having direct inductive coupling with said first-named winding for generating in response to rotation of said rotatable member a high frequency alternating current of a frequency dependent on the speed of said rotatable member, a balanced frequency discriminator having an input circuit connected to said alternating current generating means and arranged for resonance at a frequency corresponding to a predetermined desired speed of operation of said dynamoelectric machine, said discriminator having an output circuit, and means connected to said discriminator output circuit for providing substantially no component of excitation to said machine at said predetermined desired speed of operation of said machine and for providing a component of excitation above and below said predetermined speed to provide a cumulative component of excitation to the component of excitation of said main control field exciting winding at speeds above said predetermined speed and a differential component of excitation to the excitation of said main control field exciting winding at speeds below said predetermined speed.

2. A dynamoelectric machine having a stationary member and a rotatable member with a winding in slots, said stationary member having pole pieces with means including a main control field exciting winding for providing excitation to said machine, means including a pole face winding on said pole pieces inductively coupled to said winding on said rotatable member for generating a high frequency alternating current of a frequency dependent on the speed of said rotatable member, a balanced frequency discriminator having an input circuit connected to said pole face winding and arranged for resonance at a frequency of alternating current supplied by said pole face winding corresponding to a predetermined desired speed of operation of said dynamoelectric machine, said discriminator having an output circuit, and means connected to said discriminator output circuit for providing substantially no excitation to said machine at said predetermined desired speed of operation of said machine and for providing a component of excitation above and below said predetermined speed to provide a cumulative component of excitation to the component of excitation of said main control field exciting winding at speeds above said predetermined speed and a differential component of excitation to the component of excitation of said main control field exciting winding at speeds below said predetermined speed.

3. A dynamoelectric machine having a stationary member and a rotatable member with a winding in slots, said stationary member having means including a main control field exciting winding for providing excitation to said machine, a second field exciting winding on said stationary member, means on said stationary member inductively coupled to said winding on said rotatable member for generating a high frequency alternating current of a frequency dependent on the speed of said rotatable member, a balanced frequency discriminator having an input circuit connected to said alternating current generating means and arranged for resonance at a frequency corresponding to a predetermined desired speed of operation of said dynamoelectric machine, and means including said discriminator having an output circuit connected to said second field exciting winding for providing substantially no energization to said second field exciting winding at said predetermined desired speed of operation of said dynamoelectric machine for energizing said second field exciting winding above and below said predetermined speed to provide a cumulative component of excitation to the component of excitation of said main control field exciting winding at speeds above said predetermined speed and a differential component of excitation to the excitation of said main control field exciting winding at speeds below said predetermined speed.

PAUL D. ROSS.

REFERENCES CITED

The following references are of record in the file of this patent:

UNITED STATES PATENTS

| Number | Name | Date |
| --- | --- | --- |
| 1,501,489 | Hunt et al. | July 15, 1924 |
| 1,776,592 | MacDonald | Sept. 23, 1930 |
| 1,959,161 | Grondahl | May 15, 1934 |
| 1,981,040 | Gulliksen | Nov. 20, 1934 |

FOREIGN PATENTS

| Number | Country | Date |
| --- | --- | --- |
| 404,917 | Great Britain | Apr. 16, 1932 |